United States Patent [19]

Wells et al.

[11] Patent Number: 4,719,066

[45] Date of Patent: Jan. 12, 1988

[54] METHOD OF PRODUCING FLAME RETARDANT POLYAMIDE FIBER

[75] Inventors: Rodney L. Wells; Charles J. Cole, both of Chester, Va.

[73] Assignee: Allied Corporation, Morris Township, Morris County, N.J.

[21] Appl. No.: 869,511

[22] Filed: Jun. 2, 1986

Related U.S. Application Data

[63] Continuation-in-part of Ser. No. 609,606, May 14, 1984, abandoned.

[51] Int. Cl.[4] .................................................. D01F 1/02
[52] U.S. Cl. .................................. 264/211; 264/210.6; 252/608
[58] Field of Search ......................... 264/211, 210.6; 252/608, 609

[56] References Cited

U.S. PATENT DOCUMENTS

| | | | |
|---|---|---|---|
| 3,677,783 | 7/1972 | Kirkpatrick et al. | 106/292 |
| 3,728,073 | 4/1973 | Plescum | 8/115.5 |
| 3,874,883 | 4/1975 | Robitaille et al. | 106/14.21 |
| 3,953,565 | 4/1976 | Mizutani et al. | 264/210.6 |
| 3,985,926 | 10/1976 | Schwartz et al. | 428/97 |
| 4,064,298 | 12/1977 | Schwartz et al. | 428/95 |
| 4,097,630 | 6/1978 | Schwartz et al. | 428/97 |
| 4,268,432 | 5/1981 | Maslen et al. | 524/596 |
| 4,446,061 | 5/1984 | Joyce, III et al. | 252/609 |

FOREIGN PATENT DOCUMENTS 8141239 4/1981 Japan .

OTHER PUBLICATIONS

Citation: Polymer Chemistry p. 10, HITD, 556041-239.
Citation: 42 Coatings vol. 95, 1981 p. 89 95: 63886a.

Primary Examiner—Jan H. Silbaugh
Assistant Examiner—Hubert C. Lorin
Attorney, Agent, or Firm—Richard A. Anderson

[57] ABSTRACT

A flame retardant polyamide is prepared and used to make a flame retardant carpet. The polyamide fiber has incorporated therein 0.01 to 2.9 weight percent zinc, 0.002 to 0.58 weight percent molybdenum, and 0.05 to 1.3 weight percent chlorine, and is made from a masterbatch containing 1 to 20 percent of the polyamide in the extruded fiber.

2 Claims, No Drawings

METHOD OF PRODUCING FLAME RETARDANT POLYAMIDE FIBER

This is a continuation-in-part of copending U.S. Ser. No. 609,606 filed May 14, 1984, now abandoned.

BACKGROUND OF THE INVENTION

1. Field of the Invention

The present invention relates to a polyamide composition, and more particularly to a flame retardant nylon fiber, used to make a flame retardant carpet.

2. The Prior Art

A number of metal compounds have been reported in the literature as flame retardants or flame retardant synergists for various substrates.

A flame retarding composition for insulating wires is taught in Japanese Kokai J81 41 239, hereby incorporated by reference. The composition comprises chlorinated polyethylene (chlorine content 30 to 45 percent), a zinc compound and an oxide or sulfide of antimony, zirconium or molybdenum.

Fire retarded polyamide compositions are taught by U.S. Pat. No. 4,268,432 to Maslen et al., hereby incorporated by reference. The compositions comprise at least 10 weight percent polyamide, e.g., nylon 6, and at least 60 weight percent fire retardant materials, comprising halogenated organic compounds of preferably 50 weight percent halogen and optionally a synergist for the halogenated compounds, e.g., antimony, tin, zinc, iron and molybdenum oxides and zinc borate, used singly, in admixture or in the form of mixed oxides, such as zinc ferrite.

Flame resistant fibers or textiles are taught by U.S. Pat. No. 3,728,073 to Pleskun, hereby incorporated by reference. The fibers/textiles are treated or saturated with a metallic complex, preferably a molybdenum compound, in the presence of a catalyst, preferably a gaseous halogen.

Flame retardant polyamide fiber for use in carpets is disclosed in U.S. Pat. No. 4,064,298 to Schwartz et al., hereby incorporated by reference. The polyamide fiber has incorporated therein 1 to 15 weight percent zinc borate and 1 to 15 weight percent of an organic halide.

Flame retardant carpets are taught in U.S. Pat. Nos. 3,985,926 and 4,097,630, both to Schwartz et al., hereby incorporated by reference. The face fibers of those carpets have either zinc oxide or zinc hydroxide incorporated therein.

Although these patents constitute a major contribution to the art of flame retardants, generally, investigations have been continued to develop an improved flame retardant carpet without sacrificing other physical properties.

SUMMARY OF THE INVENTION

It has now been discovered that the flame retardance of polyamide fibers for use in flame retardant carpets is enhanced by the incorporation therein of about 0.01 to 2.9, preferably up to 1.7, weight percent zinc; about 0.002 to 0.58, preferably up to 0.35, weight percent molybdenum; and about 0.05 to 1.3, more preferably 0.12 to 0.38, most preferably 0.25, weight percent chlorine.

Examples of polyamides which are useful in the present invention include polycaprolactam, the polyamides which are derived from the condensation of a dicarboxylic acid with a diamine, such as polyhexamethylene adipamide and polyhexamethylene sebacamide, and copolymers thereof. The most preferred polyamide is nylon 6 (polycaproamide).

It is preferred that the zinc and molybdenum come from a single compound selected from the group consisting of basic calcium zinc molybdate and a compound having the general formula

$$yZnO \cdot xMoO_3$$

where y is greater than x but not greater than 10x. The amount of basic calcium zinc molybdate incorporated ranges from 0.2 to 5.0 weight percent based on the weight of the fiber. The amount of the latter compound incorporated ranges from 0.2 to 5.0, more preferably up to 3.0 and most preferably 0.25 to 1, weight percent based on the weight of the fiber.

The most preferred source of chlorine is chlorinated polyethylene having a chlorine content of 20 to 45, preferably about 25, weight percent. The chlorinated polyethylene is present in an amount of 0.2 to 5.0, preferably 0.5 to 1.5, most preferably 1.0, weight percent in the fiber.

Most preferably, the polyamide fiber comprising the present invention has both the chlorinated polyethylene and zinc- and molybdenum-containing compound together in the recited amounts.

The present invention also includes a flame-retardant pile carpet having a relatively pliable primary backing and a tufted surface, the surface being comprised of the polyamide fibers described above.

It is most preferred that the polyamide and flame-retardant agents be compounded to form an intimate mixture by any of the well-known methods and machines available. Thus, the present invention also includes the masterbatch polyamide composition which comprises about 10 to 50, preferably 15 to 30, weight percent of a chlorinated polyethylene and a compound containing both zinc and molybdenum, the ratio of chlorinated polyethylene to the zinc- and molybdenum-containing compound ranging from 0.5:1 to 3:1, most preferably 1.0:1 to 2.0:1. The preferred polyamide is a nylon, most preferably nylon 6, and the zinc- and molybdenum-containing compound is either basic calcium zinc molybdate or the compound having the general formula

$$yZnO \cdot xMoO_3$$

where y is greater than x but not greater than 10x. The masterbatch contains approximately 1 to 20 percent of the polyamide found in the extruded fiber. Generally, the masterbatch is diluted from 5:1 up to 100:1 to achieve the designated on-fiber levels of zinc, molybdenum and chlorine. The preferred range is 10:1 to 50:1 and most preferably is 15:1 to 40:1.

The present invention also provides, in a process for melt spinning yarn from fiber-forming polyamide polymer, the improvement comprising adding to the polymer prior to spinning a sufficient amount of zinc, molybdenum, and chlorine to achieve the previously mentioned in-fiber weight percents, to produce a flame retardant yarn.

The basic calcium zinc molybdate is commmercially available from the Sherwin-Williams Company as Kem-Gard TM 425 (hereafter Compound B), which is advertised as a molybdenum-based flame and smoke suppressant for PVC. The average of two analyses revealed 7.28 weight percent zinc and 2.29 weight percent molybdenum content. The other zinc- and molybdenum-containing compound is also available from the Sherwin-Williams Company as KemGard ™ 911B (hereafter Compound C). Analysis revealed 57.2 weight percent zinc and 11.6 weight percent molybdenum content. It is believed that U.S. Pat. Nos. 3,874,883 to Robitaille et al. and 3,677,783 to Kirkpatrick et al., both of which are hereby incorporated by reference, disclose methods of preparing the respective zinc- and molybdenum-containing compounds.

Other, conventional additives are often added to the masterbatch to produce desired properties in the end product. Functional additives such as pigments and thermal stabilizers are exemplary.

The polyamide and flame-retardant agents can be compounded to form an intimate mixture by any of the well-known methods and machines available. Minimum processing time at elevated temperature and the use of dry ingredients are preferred in order to minimize the possibility of reaction. Preferably, masterbatch chips are formed which may subsequently be blended with a base resin or melt injected to achieve desired polyamide concentration in the final, extruded fiber.

The carpets in the examples below were tested by the ASTM-E-648 Flooring Radiant Panel (FRP) method for measuring the surface flammability of materials exposed to a radiant heat energy source. The test apparatus comprises a gas fired refractory radiant panel inclined at a 30 degree angle over the exposed portion of a horizontally mounted test specimen. The specimen surface is 3 to 9 inches (7.6 to 23 cms) below the lower edge of the radiant panel. The radiant panel and an adjustable height speciman transport system are enclosed in an asbestos mill board sheathed chamber with provision for a free flow of draft-free air to simulate natural burning conditions. There is a glass viewing window in the front face of the chamber. Below the window is a door which can be opened to facilitate placement and removal of the test speciman. In the examples herein, the test conditions selected involve a 30 degree panel angle, a panel temperature of 500° C., and the distance from panel to sample is 5.5 inches (140 mm). Three carpet samples, about 10×40 inches (25×100 cm), are cut for testing. The carpet samples are burned over boards/pads as specified in the examples. These carpet samples were tested by the prescribed procedure after a two-day cure period. A class I carpet is one that tests above 0.45 watts/cm². A Class II carpet is one that tests at 0.22 to 0.45 watts/cm².

Other tests to which the fibers of the present invention were subjected in some of the following examples are AATCC Method 16E-1981 for lightfastness, AATCC-Method 129-1981 for ozone fastness and AATCC-Method 16A-1977 carbon arc exposure for breaking strength retention. All of these tests are hereby incorporated by reference.

DESCRIPTION OF THE PREFERRED EMBODIMENT

When carpeting is conventionally manufactured, the fibers are tufted on a relatively pliable primary backing which may be manufactured from any suitable materials such as jute or a man-made fiber such as polypropylene. The non-wear side of the backing is then coated with a bonding material of any suitable type such as latex. The latex serves to hold the fibers in place so that they cannot be pulled free from the primary backing, and also to bond the primary backing to the secondary backing. The secondary backing, which may also be jute or artificial fiber, strengthens the carpet and ensures that the bonding material does not come into contact with the floor upon which the carpet is laid.

In one preferred embodiment, the present invention provides a flame-retardant pile carpet having a relatively pliable primary backing and a tufted surface, said surface being comprised of fibers having incorporated therein about 0.01 to 2.9 weight percent zinc, about 0.002 to 0.58 weight percent molybdenum, and about 0.05 to 1.3 weight percent chlorine.

The following examples are illustrative of the present invention. Parts and percentages are by weight unless otherwise indicated. In the tables accompanying the examples, Compounds A through D are referred to as A, B, C and D.

EXAMPLE 1

A flammability masterbatch was prepared by blending 15.25 pounds (6.9 kg) chlorinated polyethylene, 25% chlorine (hereafter Compound A), 7.75 pounds (3.5 kg) Compound B, and 2.00 pounds (0.91 kg) other additives, to total 25.0 pounds (11 kg) powdered additives, and then feeding the additives through a hopper into an extruder along with 75 pounds (34 kg) nylon 6 polymer (a white solid having a relative viscosity of about 50 to 60 as determined at a concentration of 11 grams of polymer in 100 ml of 90 percent formic acid at 25° C.-ASTM D-789-62T). The polymer masterbatch strand was extruded, quenched and pelletized. Nylon chip was blended with the masterbatch chip at an 11.5:1 ratio to provide a chip blend for spinning fiber. The calculated fiber add-on was 1.22 weight percent Compound A and 0.62 weight percent Compound B.

The polymer chip blend was melt extruded under pressure through a spinnerette to produce an undrawn yarn which was then draw textured to a 48 filament product with nominal drawn denier of 1282. This textured yarn was used to produce carpets for evaluation. A control yarn, without the referenced additives, was produced on the same equipment to give a comparable 1282/48 drawn yarn.

The 1282/48 yarns were three-plied with a ⅜ S-twist for a non-heatset product. Additional yarns were direct-cabled (twisted) 4.5×4.5 and Superba heatset at 132° C. prior to tufting. Carpets were tufted into various weights and pile heights (see Table 1) using a polypropylene primary backing and using a 1/10 gauge tufting machine. These carpets were dyed a suitable shade for evaluation and backed with a regular styrene-butadiene (SBR) latex and an Actionbak (polypropylene) secondary backing.

The carpets were tested by the Flooring Radiant Panel (FRP) method referenced above. Three carpet samples, about 10×40 inches, (25×100 cm) were cut for FRP testing. The carpet samples were glued to an asbestos board and tested by the prescribed procedure after a two-day cure. Results which are presented in Table 1 are the average for the three samples. The carpets of the present invention were in Class I in each case except for the 20 oz/yd² (0.7 kg/m²) level loop carpet. Note that the control, however, in each instance was only Class II.

The yarns were also tested for lightfastness, ozone fastness, and breaking strength retention in accordance with the referenced tests. No adverse affect on lightfastness at 100 hours, ozone fastness at 2 cycles, or strength retention was found.

The fiber produced therefrom had 296 ppm zinc and 88 ppm molybdenum.

EXAMPLE 2

A chip blend was prepared as in Example 1 with the following additives: 15.25 pounds (6.9 kg) Compound A, 7.75 pounds (3.5 kg) Compound B and 0.75 pounds (0.34 kg) other additives. The masterbatch comprised 76.25 percent nylon and 23.75 percent powder blend of additives. The polymer chip blend was spun as a 24 denier per filament product for staple. The undrawn staple tow was drawn and cut into eight inch (20 cm) staple which was spun into 3.75/2 cotton count yarn with 5.6Z×5.2S twist. The spun staple yarn was Suessen heatset at 200° C. prior to tufting. The staple was tufted on a 1/10 gauge tufting machine with carpets at 32 or 42 oz/yd² (1.1 or 1.4 kg/m²) weight. Carpets were dyed and backed as described in Example 1.

A control yarn, without the referenced additives, was formed on the same machinery in accordance with this example, and formed into a carpet for testing. Flammability testing and fastness evaluations were performed as in Example 1 with results presented in Table 2. Again, the carpets with flammability additives were in Class I (except for carpet c) while the control was not, and no adverse affects on lightfastness, ozone fastness and breaking strength retention were found.

Analysis of the fiber revealed 307 ppm zinc and 108 ppm molybdenum.

TABLE 1

| Carpet No. | Weight oz/yd² (kg/m²) | Pile Height Inches (cm) | Style | Heat-set | CFR (watts/cm²)* |
|---|---|---|---|---|---|
| a | 32 (1.1) | ⅜ (0.95) | cut pile | Superba | 0.644 Class I |
| b (control) | 32 (1.1) | ⅜ (0.95) | cut pile | Superba | 0.363 Class II |
| c | 20 (0.7) | 3/16 (0.48) | level loop | NHS** | 0.381 Class II |
| d (control) | 20 (0.7) | 3/16 (0.48) | level loop | NHS** | 0.336 Class II |
| e | 28 (0.9) | 3/16 (0.48) | level loop | NHS** | 0.708 Class I |
| f (control) | 28 (0.9) | 3/16 (0.48) | level loop | NHS** | 0.379 Class II |

*Critical Radiant Flux, average for three samples
**NHS - non-heatset

TABLE 2

| Carpet No. | Weight oz/yd² (kg/m²) | Pile Height Inches (cm) | Style | CFR (watts/cm²)* |
|---|---|---|---|---|
| a | 32 (1.1) | 5/16 (0.79) | cut pile | 0.555 Class I |
| b (control) | 32 (1.1) | 5/16 (0.79) | cut pile | 0.351 Class II |
| c | 42 (1.4) | ⅜ (0.95) | cut pile | 0.522 Class I |
| d (control) | 42 (1.4) | ⅜ (0.95) | cut pile | 0.336 Class II |

*Critical Radiant Flux, average for three samples

EXAMPLES 3-10

A blend of 150 pounds (68 kg) of nylon 6 chip, 0.45 pound (0.20 kg) Compound B, and 1.06 pounds (0.48 kg) Compound A was fed to an extruder and spun to produce nylon 6 fibers. These fibers were taken up on a winder with prior application of spin finish. The yarn was drawn and textured to a 70 filament product with nominal drawn denier of 1125. The drawn yarn was cabled (3¼×3¼), heat set at 132° C. and tufted into a cut pile Saxony carpet on a 3/16 gauge tufter, with ¾ inch (1.9 cm) pile height, 33 oz/yd² (1.1 kg/m²), into FLW primary backing. A control polymer was spun and processed into a similarly constructed carpet (Example 3). The carpets were dyed in an acid yellow shade. The dyed carpets were backed with regular SBR latex and Actionbak secondary backing. Flammability was tested by ASTM E-648 Flooring Radiant Panel Test. The sample with Compound B at 0.3 weight percent and Compound A at 0.7 weight percent had an average of greater than 1.13 watts/cm² compared to 0.430 for the control carpet. Thus, the carpet of the present invention was a Class I carpet, while the control was Class II.

In Examples 4–7, the referenced additives were coated on nylon chips which were then similarly melt extruded to produce an undrawn yarn which was then draw textured and used to produce carpets for evaluation. In Example 4, 150 pounds (68 kg) of nylon 6 chip was coated with 205 grams compound B and 480 grams Compound A to produce a fiber having the additive levels shown in Table 3. In Example 5, 150 pounds (68 kg) of nylon 6 polymer chip was coated with 205 grams Compound C and 480 grams Compound A. In Examples 6 and 7, 150 pounds (68 kg) of nylon 6 polymer chip were treated with 345 grams Compound A and 345 grams of, respectively, Compound B and Compound C.

In Example 8, a blend of 150 pounds (68 kg) of nylon 6 polymer chip and 515 grams of pellets comprising 40% antimony trioxide and 60% nylon (hereafter Compound D) were treated with 480 grams Compound A. In Examples 9 and 10, a blend of 150 pounds (68 kg) of nylon 6 polymer chip and 260 grams Compound D were treated with 480 grams Compound A and 105 grams of, respectively, Compound B and Compound C.

The carpets were tested by the referenced FRP method. Results are presented in Table 3. Carpets made from fibers of the present invention (Examples 4–7), as well as from comparative examples 8–10, were Class I.

Some of the yarn formed in each of these examples was knitted into sleeves which were acid mock dyed and tested for breaking strength retention, 200 hours carbon arc, in accordance with AATCC 16A-1977. Results are presented in Table 3. It can be seen that the inclusion of antimony trioxide as a flame retardant (Examples 8–10) causes an extreme loss of breaking strength, which would require additional stabilizers to bring back up. It was also noted that during carpet dyeing antimony was lost from the fiber which could present potential wastewater treatment plant problems.

EXAMPLES 11-17

A first masterbatch was prepared by blending Compound A with nylon 6 polymer to achieve 40 weight percent Compound A. A second masterbatch was prepared by blending Compound B with nylon 6 polymer to achieve 10 weight percent Compound B. Example 11 was the control, without any of the referenced additives, but produced on the same equipment to give a comparable 1282/48 drawn yarn. In each of the examples the 1282/48 yarns were three-plied for a non-heatset product. Level loop carpets were made having 28 oz/yd² (0.95 kg/m²) weight. Carpets were backed as in Example 1.

The carpets were tested by the Flooring Radiant Panel (FRP) method referenced previously, with glue down on an asbestos board. Examples 11–13 and 17 were tested by the prescribed procedure after a two-day cure. Examples 14–16 were tested both after a two-day cure and after a four-day cure. Results are presented in Table 4. The fibers were analyzed for their zinc, molybdenum and chlorine content, also presented in Table 4.

In Example 12 nylon chip was blended with the first masterbatch chip at a 38:1 ratio to provide the chip blend for spinning fiber. Calculated fiber additives are listed in Table 4. In Example 13, nylon chip was blended with the second masterbatch chip at a 19:1 ratio to provide the chip blend for spinning fiber. In Example 14, nylon chip was blended with both first and second masterbatch chip at a 12:1 ratio to provide the chip blend for spinning fiber. In Example 15, nylon chip was blended with both masterbatch chips at a 20:1 ratio to provide the chip blend for spinning fiber. In Example 16, the ratio of nylon chip to both masterbatch chips was 15:1, and in comparative Example 17, the ratio of nylon chip to both masterbatch chips was 40:1.

Examples 14–16 showed significant increase in flame retardance.

EXAMPLES 18–23

A 67 pound (30 kg) masterbatch was prepared in accordance with Example 1 and comprised 8 weight percent Compound A, 8 weight percent Compound C, 0.806 weight percent other additives, and 83.2 weight percent nylon 6. Nylon chip was blended with the masterbatch chip at a 15:1 ratio to provide a chip blend for spinning fiber. The calculated fiber add-on per flame retarded end of yarn was 0.17 weight percent Compound A and 0.17 weight percent Compound C.

The polymer chip blend was melt extruded under pressure through a spinnerette to produce an undrawn yarn which was then draw textured to a 48 filament product with nominal drawn denier of 1282. This textured yarn was used to produce carpets for evaluation. A control yarn, without the referenced additives, was produced on the same equipment to give a comparable 1282/48 drawn yarn in Example 18.

For Examples 19–23, the number of yarn ends utilized which had the flame retarding additives was as indicated in Table 5. The 1282/48 yarns were three-plied with a ¾ S twist. In Examples 18–21, yarn construction was ⅛ gauge tufting machine, level loop carpet, 3/16 inch (0.48 cm) pile height, 28 oz/yd$^2$ (0.95 kg/m$^2$) weight. In Examples 22 and 23, the carpet weights were 20 oz/yd$^2$ (0.68 kg/m$^2$) and 34 oz/yd$^2$ (1.2 kg/m$^2$), respectively. Carpets 20–23 of the present invention were all Class I while the control (Example 18) was Class II. It can be seen that with every increase of ends with flame retarding additives, performance increased.

Table 6 sets forth possible masterbatch compositions with calculated metal content in the masterbatch.

TABLE 3

| Example | Burn 1 | Burn 2 | Burn 3 | Avg | Class | Additives | Zn (ppm) | Mo (ppm) | B.S.R.[2] |
|---|---|---|---|---|---|---|---|---|---|
| 3 (control) | 0.387 | 0.460 | 0.442 | 0.430 | II | None | 2 | 0 | 47.9% |
| 4 | >1.13 | 0.387[1] | >1.13 | >1.13 | I | 0.7% A + 0.3% B | 128 | 20 | 44.6% |
| 5 | 0.898 | >1.13 | >1.13 | >1.13 | I | 0.7% A + 0.3% C | 137 | 41 | 37.4% |
| 6 | >1.13 | >1.13 | >1.13 | >1.13 | I | 0.5% A + 0.5% B | 228 | 48 | 43.6% |
| 7 | >1.13 | >1.13 | >1.13 | >1.13 | I | 0.5% A + 0.5% C | 2067 | 105 | 57.7% |
| 8 (comparative) | >1.13 | >1.13 | >1.13 | >1.13 | I | 0.7% A + 0.3% D | — | — | 4.7% |
| 9 (comparative) | >1.13 | >1.13 | >1.13 | >1.13 | I | 0.7% A + 0.15% B + 0.15% D | 70 | 8 | 16.9% |
| 10 (comparative) | >1.13 | >1.13 | >1.13 | >1.13 | I | 0.7% A + 0.15% C + 0.15% D | 74 | 8 | 17.8% |

[1] In Example 4, burn 2 was excepted from average; even if included, average would still represent Class I.
[2] Breaking Strength Retention, 200 hours carbon arc AATCC 16A-1977 on Mocked Dyed Sleeves of yarn

TABLE 4

| Example | On Fiber Additives | Zn | Mo | Cl$^-$ | 2 day cure 1 | 2 | 3 | 4 day cure 1 | 2 | 3 | Average (all data) |
|---|---|---|---|---|---|---|---|---|---|---|---|
| 11 (control) | none | <0.09 | <3 | 0 | 0.369 | 0.333 | 0.363 | — | — | — | 0.363 |
| 12 (comparative) | 1% A | 0.56 | <3 | 2190 | 0.478 | 0.554 | 0.574 | — | — | — | 0.535[1] |
| 13 (comparative) | 0.5% B | 308 | 104 | 640 | 0.593 | 0.496 | 0.351 | — | — | — | 0.48[1] |
| 14 | 1% A + 0.5% B | 337 | 108 | 2300 | 0.423 | 0.940 | 0.950 | 1.13 | 1.13 | 1.13 | 0.951[1] |
| 15 | 0.7% A + 0.3% B | 244 | 73 | 1600 | 0.387 | 0.782 | 0.828 | DNI[2] | 0.514 | 0.496 | 0.69[1] |
| 16 | 0.5% A + 0.5% B | 325 | 102 | 1330 | 1.019 | 0.852 | 0.369 | 0.574 | 0.554 | 1.019 | 0.731[1] |
| 17 (comparative) | 0.36% A + 0.16% B | 113 | 33 | 1290 | 0.311 | 0.405 | 0.311 | — | — | — | 0.34 |

[1] Class I
[2] DNI - did not ignite (>1.13)

TABLE 5

| Example | Fiber Add-On (%) | Flame Retarded Ends | 1 | 2 | 3 | Average | Class |
|---|---|---|---|---|---|---|---|
| 18 (control) | None | 0/3 | 0.369 | 0.333 | 0.369 | 0.357 | II |
| 19 | 0.17 A + 0.17 B | 1/3 | 0.460 | 0.423 | 0.593 | 0.492 | I |
| 20 | 0.33 A + 0.33 B | 2/3 | 0.534 | 0.633 | 0.496 | 0.554 | I |
| 21 | 0.5 A + 0.5 B | 3/3 | 0.574 | 0.574 | 0.554 | 0.567 | I |

TABLE 5-continued

| Example | Fiber Add-On (%) | Flame Retarded Ends | Critical Radiant Flux (watts/cm$^2$) | | | Average | Class |
|---|---|---|---|---|---|---|---|
| | | | 1 | 2 | 3 | | |
| 22 | 0.5 A + 0.5 B | 3/3 | 0.514 | 0.478 | 0.554 | 0.515 | I |
| 23 | 0.5 A + 0.5 B | 3/3 | 0.574 | 0.613 | 0.613 | 0.600 | I |

TABLE 6

| Additives (%) | Flame Retardants | Ratio | Calculated Content[1] | | |
|---|---|---|---|---|---|
| | | | Zn | Mo | Cl$^-$ |
| 10 | A + B | 1A:1B | 0.364 | 0.115 | 1.25 |
| 10 | A + C | 1A:1C | 2.86 | 0.58 | 1.25 |
| 10 | A + B | 2A:1B | 0.242 | 0.076 | 1.67 |
| 10 | A + C | 2A:1C | 1.90 | 0.386 | 1.67 |
| 50 | A + B | 1A:1B | 1.82 | 0.573 | 6.25 |
| 50 | A + C | 1A:1C | 14.3 | 2.90 | 6.25 |
| 50 | A + B | 2A:1B | 1.21 | 0.382 | 8.33 |
| 50 | A + C | 2A:1C | 9.50 | 1.93 | 8.33 |

[1]Based on Compound B having 7.275% Zn and 2.29% Mo content (average of two analyses) and Compound C having 57.2% Zn and 11.6% Mo content.

EXAMPLE 24

Additional testing was carried out on a fiber prepared as in Example 1 except Compound C was used (instead of Compound B) and the amounts of additives were adjusted so that the fiber contained about 1 percent Compound A and about 0.4 percent Compound C, for the fiber of this invention. Comparative samples were also prepared in the same way using the additives shown in Table 7.

TABLE 7

| Example | Percent by Weight of Fiber of Compound | | | | | |
|---|---|---|---|---|---|---|
| | A | C | E* | F* | G* | H* |
| control | 0 | 0 | 0 | 0 | 0 | 0 |
| 1 | 1 | 0.4 | — | — | — | — |
| 2 (comparative) | — | — | 0.6 | 0.8 | — | — |
| 3 (comparative) | 1 | — | 0.6 | — | — | — |
| 4 (comparative) | — | — | 0.6 | — | 0.8 | — |
| 5 (comparative) | — | — | 0.6 | — | — | 0.6 |
| 6 (comparative) | — | — | 0.6 | 0.4 | — | — |

*E is antimony trioxide
*F is a brominated aliphatic imide, namely, ethylene-bis-(5,6-dibromo-norbornane-2,3-dicarboximide) also known as Saytex BN451 (Ethyl)
*G is a proprietary complex polybrominated compound known as Saytex 120 from Ethyl Corporation
*H is a chlorinated alicyclic hydrocarbon, 1,2,3,4,7,8,9,10,13,13,14,14-dodecachloro-1,4,4a,5,6,6a,7,10,10a,11,12,12a,dodecahydro-1,4:7,10 dimethanodibenzo (a,e)-cyclooctene also known as Dechlorane Plus (Occidental Chemical)

A and C are defined in the above examples as chlorinated polyethylene and zinc molybdate respectively.

To determine the degree of discoloration of the fiber due to addition of the various compounds, the following samples were measured for yellowness by the ASTMD-1925 method, using a Hunter Colorimeter Model D25M-9 to measure.

| Example | Yellowness Index |
|---|---|
| control | 5.14 |
| 1 | 10.36 |
| 2 (comparative) | 35.36 |

To determine the affect of the additives on light fastness, testing by exposure to the Xenon light LF (AATCC-16E-1982) was done, with the following results.

| Example | Xenon LF (80 std. fade units) Fabric Dyed | |
|---|---|---|
| | Acid Beige | Argent Gray |
| | (Gray scale units) | |
| control | 3 | 3 |
| 1 | 3 | 2–3 |
| 2 (comparative) | 2–3 | 1 |
| 6 (comparative) | 2–3 | 1 |

Further testing of breaking strength after exposure to 200 hours of carbon are (AATCC-16A) was done showing the negative affect of antimony compounds, as follows.

| Example | Percent Strength Retained |
|---|---|
| control | 91.7 |
| 1 | 84.3 |
| 2 (comparative) | 32.4 |
| 2 (control) | 84.2 |
| 3 (comparative) | 23.8 |
| 4 (comparative) | 6.5 |
| 5 (comparative) | 18.9 |

Control 2 marks a second run, i.e., a new basis for the resulting percent results to be compared against.

Finally, it should be noted that several of the comparative additives, not listed here, but tested, such as antimony pentoxide, and some brominated flame retardant compounds, when added to nylon polymer could not be extruded through a spinnerette to make fiber, when incorporated by the above masterbatch system.

We claim:

1. In a process for melt-spinning yarn from fiber-forming polyamide polymer, the improvement comprising: adding to the polymer prior to spinning a sufficient amount of zinc, molybdenum and chlorine as compounds to achieve in the spun fiber about 0.01 to 2.9 weight percent zinc, about 0.002 to 0.58 weight percent molybdenum, and about 0.05 to 1.3 weight percent chlorine;

whereby a polyamide yarn is produced which exhibits enhanced flame retardance without adverse breaking strength retention.

2. In a process for melt-spinning yarn from fiber-forming polyamide polymer, the improvement comprising: adding to the polymer prior to spinning a sufficient amount of zinc, molybdenum and chlorine to achieve in the fiber about 0.01 to 2.9 weight percent zinc, about 0.002 to 0.58 weight percent molybdenum, and about 0.05 to 1.3 weight percent chlorine; and the zinc, molybdenum and chlorine are added to said polyamide polymer in a masterbatch of polyamide polymer containing yZnO.xMoO$_3$ where y is greater than x but not greater than 10x, and chlorinated polyethylene, said masterbatch being prepared by blending said zinc, molybdenum and chlorine compounds as powdered additives into poyamide polymer to create a polyamide polymer masterbatch containing concentrated amounts of said zinc, molybdenum and chlorine, and the masterbatch is diluted to achieve the designated levels of zinc, molybdenum, and chlorine;

whereby a polyamide yarn is produced which exhibits enhanced flame retardance without adverse breaking strength retention.

* * * * *